United States Patent
Wrighton et al.

(10) Patent No.: US 10,120,655 B2
(45) Date of Patent: Nov. 6, 2018

(54) SEAMLESS HIGH PERFORMANCE INTEROPERABILITY BETWEEN DIFFERENT TYPE GRAPHS THAT SHARE A GARBAGE COLLECTOR

(71) Applicant: Microsoft Technology Licensing, LLC, Redmond, WA (US)

(72) Inventors: David C. Wrighton, Redmond, WA (US); Scott D. Mosier, Redmond, WA (US); Patrick H. Dussud, Redmond, WA (US)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 34 days.

(21) Appl. No.: 15/172,184

(22) Filed: Jun. 3, 2016

(65) Prior Publication Data

US 2017/0351490 A1  Dec. 7, 2017

(51) Int. Cl.
*G06F 8/30* (2018.01)
*G06F 9/50* (2006.01)
*G06F 12/02* (2006.01)

(52) U.S. Cl.
CPC ............ *G06F 8/315* (2013.01); *G06F 9/5022* (2013.01); *G06F 12/0269* (2013.01); *G06F 2212/1044* (2013.01); *H05K 999/99* (2013.01)

(58) Field of Classification Search
CPC .... G06F 8/315; G06F 9/5022; G06F 12/0269; G06F 2212/1044; H05K 999/99
USPC .......................................................... 717/116
See application file for complete search history.

(56) References Cited

U.S. PATENT DOCUMENTS

| | | | |
|---|---|---|---|
| 6,142,684 A | 11/2000 | Kirshenbaum et al. | |
| 7,010,791 B2* | 3/2006 | Cierniak | G06F 9/4428 719/315 |
| 7,647,587 B2 | 1/2010 | Knoblock et al. | |
| 7,788,300 B2* | 8/2010 | Kuck | G06F 12/0253 707/813 |
| 8,261,248 B2* | 9/2012 | Brendle | G06F 9/45537 717/148 |
| 2010/0180264 A1 | 7/2010 | Aharoni et al. | |
| 2013/0042258 A1* | 2/2013 | Rector | G06F 8/51 719/328 |

OTHER PUBLICATIONS

Yau, et al., "An object-oriented approach to software design for distributed real-time computing systems", In Proceedings of the Fourth Workshop on Future Trends of Distributed Computing Systems, Sep. 22, 1993, pp. 297-303.

(Continued)

*Primary Examiner* — Anna C Deng

(57) ABSTRACT

Multiple different type hierarchies can communicate in a high performance and seamless manner by sharing a GC and interface dispatch logic. A runtime environment can support multiple independent type hierarchies, each type hierarchy defined by the module which defines the root of a type graph and some other helper functionality. Code that uses the dispatch logic has to follow certain rules in order to maintain GC and type safety. Different types in disjoint type graphs can behave as if they were one type for cross type graph communication purposes.

18 Claims, 9 Drawing Sheets

(56) References Cited

OTHER PUBLICATIONS

Mitchell, Nick, "The Runtime Structure of Object Ownership", In Proceedings of 20th European conference on Object-Oriented Programming, Jul. 3, 2006, 13 pages.
Hirzel, et al., "Understanding the Connectivity of Heap Objects", In the Proceedings of the 3rd International Symposium on Memory Management, Jun. 20, 2002, pp. 36-49.
"International Search Report and Written Opinion Issued in PCT Application No. PCT/US2017/034919", dated Sep. 4, 2017, 10 Pages.
Vitek, et al., "Compile-Time Analysis of Object-Oriented Programs". In the Fourth International Conference on Compiler Construction, Oct. 5, 1992, pp. 236-250.

\* cited by examiner

```
using System;
using SeamlessInterfaces;

namespace SeamlessInterfaces
{
                                            ─250
  [TypeIdentifier("fece12de-31b7-4bfd-8dee-64d2a9fd1f73", "ITypeRepresentation_Version1")]
  interface ITypeRepresentation
  {
    int GetAttributes();
  } class InteropWithRuntime
  {
    [RuntimeImport]
    extern static ITypeRepresentation GetTypeRepresentationFromHandle(IntPtr handle);
  }
} namespace System
{
  struct IntPtr
  { } struct RuntimeTypeHandle
  {
    internal IntPtr _underlyingIntPtr;
  }
  class Object
  { }
```

FIG. 2b

```
class Type
{
    static Type GetTypeFromHandle(RuntimeTypeHandle handle)
    {
        Type newType = new Type();
        // Here we use a well known function of the runtime to acquire an instance of an
object that implements a seamless interface                              ⎯ 251
        newType._typeRepresentation =
InteropWithRuntime.GetTypeRepresentationFromHandle(handle._underlyingIntPtr);
        return newType;
    }

ITypeRepresentation _typeRepresentation;
    public int Attributes
    {
        get
        {
            // This is where the seamless interface call to the runtime occurs
            return _typeRepresentation.GetAttributes();
        }
                                                              252
    }
} class Application
{
    int SampleFunctionThatDemonstratesBehavior(RuntimeTypeHandle handle)
    {
        Type t = Type.GetTypeFromHandle(handle);

//...

// At this time, the managed object t is keeping TypeRepresentation object alive even
though they are not in the same type graph
```

```
using System;
using SeamlessInterfaces;

namespace SeamlessInterfaces
{
  [TypeIdentifier("fece12de-31b7-4bfd-8dee-64d2a9fd1f73", "ITypeRepresentation_Version1")]
  interface ITypeRepresentation
  {
    int GetAttributes();
  } class InteropWithRuntime
  {
    [RuntimeExport]
    static ITypeRepresentation GetTypeRepresentationFromHandle(IntPtr handle)
    {
      return new TypeRepresentation(handle);
    }
  }
} class TypeRepresentation : ITypeRepresentation
{
  public TypeRepresentation(IntPtr handle)
  {
    // Initialize the fields of this type.
  }

// ... There are fields here.
```

```
    // This method implements the seamless interface ITypeRepresentation
    public int GetAttributes()
    {
        // Compute and return the set of attributes based on runtime data, and the fields of this type.
    }
} namespace System
{
    struct IntPtr
    { } class Object
    { }
```

255

SEAMLESS HIGH PERFORMANCE INTEROPERABILITY BETWEEN DIFFERENT TYPE GRAPHS THAT SHARE A GARBAGE COLLECTOR

BACKGROUND

In the realm of computer science, garbage collection (GC) is a form of automatic memory management in which a garbage collector finds and reclaims memory occupied by data that is no longer in use by an executing program. Garbage collection can consume a significant proportion of processing resources and thus can have a significant impact on performance. The advantages of garbage collection include but are not limited to the following. The programmer does not have to explicitly de-allocate memory, thereby eliminating or substantially reducing the types of programming bugs associated with these activities.

In addition, with GC, certain types of memory leaks can be avoided. A memory leak occurs when the memory occupied by unreachable objects becomes unusable. However, because the garbage collector determines which memory to free, overhead is incurred, which can lead to decreased or uneven performance Additional memory is often needed to compensate for the GC overhead in order for the program to be able to perform as fast as when explicit memory management is performed. Pauses in program execution may occur at the time at which the garbage is actually collected. These pauses may be unacceptable when performing certain tasks.

SUMMARY

Multiple different type hierarchies can communicate in a high performance and seamless (transparent) manner by sharing a garbage collector and interface dispatch logic. A runtime environment can support multiple independent type hierarchies within the same GC environment. Each type hierarchy can be defined by a module which defines the root of a type graph for the type hierarchy. The runtime environment can also include helper functionality. The helper functionality can include functionality that allocates new exceptions of the appropriate type graph upon request, functionality that resolves metadata to nodes in the type graph, functionality for reporting unhandled exceptions to code local to a particular type graph, and/or the functionality to build up a described stack frame within the data held in an exception object. Code that uses the dispatch logic can follow certain rules to maintain GC and type safety. Different types in disjoint type graphs can behave as if they were one type for cross type graph communication purposes.

An API surface which enables object oriented programming can be provided. The API surface can integrate with the garbage collector to allow code in one type graph to keep alive resources that are implemented by code in another type graph. An application binary interface (ABI) describes a binary contract for calling functions, methods, APIs, etc. at a machine-level. The contract can include an identification or name associated with a function, a signature (used to call the function), an order of parameters passed to the function and/or data types associated with parameters and so on. Definitions, and/or rules for exposing behavior associated with a type may also be included. ABI style versioning for a subset of interfaces in a dynamic garbage collected runtime enables type-safe passage of objects from one type graph to another. Some programming platforms such as Microsoft .NET and Oracle Java, etc., define their API surface in terms of a single type hierarchy on which all types and methods can be represented. Such platforms typically only define type compatibility between objects and function call behavior for types and methods which are present on the same instance of a type graph. Other platforms do not define the existence of a single type hierarchy and define compatibility of types as the memory layout, and allow function calls between any set of functions based on the memory layout of parameters of methods. Such an approach is followed by programming platforms that follow the C programming language ABI (Application Binary Interface). The subject matter described herein describes enabling C ABI function and type compatibility for a subset of functions within programming platforms which normally require more exact type checking.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

In the drawings:

FIG. 2b illustrates an example of application code in accordance with aspects of the subject matter described herein.

DETAILED DESCRIPTION

Overview

Figure 1A:
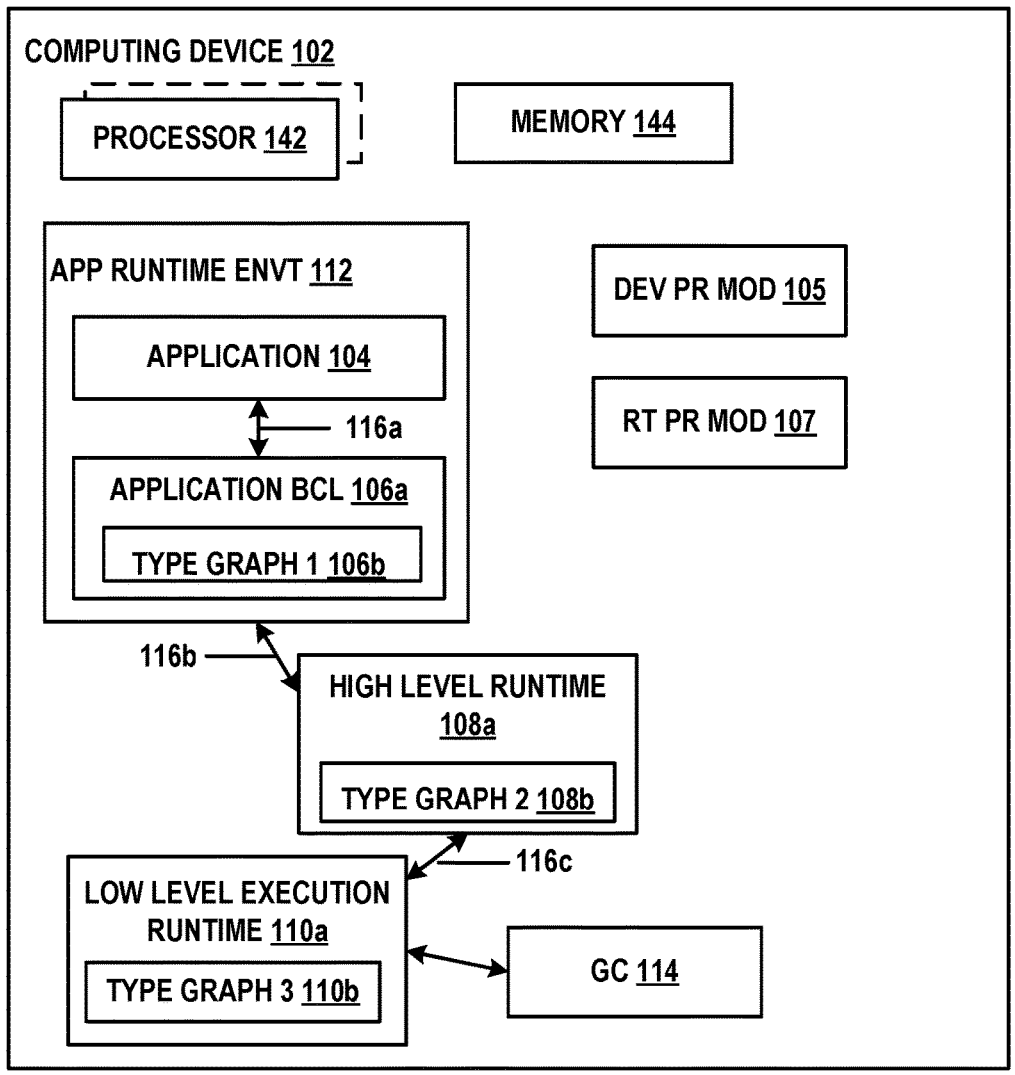
FIG. 1a is a block diagram 100 representing an example of a system for seamless high performance interoperability between different type graphs in accordance with aspects of the subject matter described herein.

When developing code, whether in a programming language such as but not limited to Microsoft's C# or Oracle's Java, it is common to develop additional code (e.g., libraries, etc.) and support functionality in the same language. When doing so, it is easy to wind up with code that is tightly coupled, meaning that all the code has to agree on fundamental concepts, such as for example, the definition of a string, the definition of an array, the definition of an object, the definition of a dictionary type and so on. Doing so makes it difficult to evolve different pieces of code that are logically separate at different rates. Some known tool chains intermingle the application and the execution environment. A tool chain is a set of software utilities used to perform an operation. For example, in program development, a tool chain may turn source code into a working machine language program. By extracting high-level characteristics of a lower level execution environment from the application layer execution environment, the ability for users to produce executables that can interoperate with other executables is enhanced. Additionally, executables can become more version resilient because, in part, the type graph of the lower level execution environment is independent of the type graph of the application's execution environment.

In accordance with aspects of the subject matter described herein, systems and methods are described in which the runtime system can run application layer code written in the same language as the runtime code at arm's length. "At arm's length" means application layer code does not have to use exactly the same type space environment as does the runtime. That is, a formal contract that allows more operational flexibility is established.

Described within are systems and methods for providing arm's length distance between the runtime and the code that the runtime is running in a familiar way using one garbage collection heap. Furthermore, the described systems and methods do not impose significant performance loss. Known systems enable independent type graphs to execute within the same process. Such systems may use the same GC heap, thus achieving the benefits of lifetime management of objects, but are unable to communicate with each other in an object oriented way. That is, for example, in known systems it is not possible to pass an object that represents allocated memory from one type graph to another and have the lifetime management mechanisms work correctly so that when the runtime type graph holds an object that comes from the application execution environment layer, the correct object lifetime management occurs. Moreover, known systems fail to allow the use of all the features of the programming language. In accordance with aspects of the subject matter described herein, multiple type space environments can interact in a natural way that allows the building of a rich API (application programming interface) surface that is still sufficiently restricted through various formalisms described below so that independent versioning of the code in the different type spaces can occur.

Interfaces can be exposed as equivalent between multiple type graphs by, for example, using a unique identifier. For example, an interface can be identified by the identifier INAME. The INAME interface can be defined in multiple type spaces. Interfaces named INAME can be considered equivalent across the type spaces in which the INAME interface is defined. Each interface named INAME can have a method that can receive a name and transfer data in a type safe manner across the type spaces. Object oriented code includes the concept of base types. An object is of some kind of type. For example, a string can be of a type of a particular object that has been received. The string type is of a base type which derives from a root node of a type graph. Each type has an identity (a name that identifies it). An object allocated in a first type space can be passed to an environment of a second type space which is based on a different version or identity of a second type graph.

Communication between the environments can occur via the identically-named interfaces associated with the different type spaces. The identically-named interfaces can be treated as the same equivalent interface so that an object can be passed from environment one to environment two. Each environment can have its own concept of a dictionary type for its own implementation purposes. Code in one environment is not constrained to use the same type definition as does code in a second environment. This means the lower level runtime execution environment has to be able to run many different applications that do not all use the same dictionary type that it uses.

In accordance with some aspects of the subject matter described herein, a module can be given a unique identifier that identifies it as a module that defines attributes of types. For example, TypeIdentifierAttribute.TypeIdentifierAttribute can be an attribute defined in any module that has the name TypeIdentifierAttribute, and can take a constructor with two string parameters (scope and identifier). By fixing the scope parameter, the comparison data for the equivalence comparison can be simplified. By making seamless interoperability types private, compatibility concerns with respect to any previously implemented equivalence features can be avoided. In addition, by making the type private, referencing the same type from multiple modules and having complex interface method override rules for complex type hierarchies can be avoided. In accordance with some aspects of the subject matter described herein, interface methods may have signatures with the contents such as but not limited to: other type-equivalent interfaces, structures with identical layout, integral and floating point primitive types, pointers and managed pointers to the above.

In accordance with some aspects of the subject matter described herein, a compiler can be enhanced to detect invalid method patterns. The compiler may produce a compilation error when an invalid method pattern (e.g., an invalid method signature) is detected. A method's signature is the set of parameters and the type of return value of the method. For example, one method may take 3 integer parameters and return a Boolean value. Its signature would be 3 integers returning a Boolean. In accordance with some aspects of the subject matter described herein, the set of valid signatures can be defined to include a specified set of types. The allowable set of types can be defined as the set of types comprising type-equivalent interface structures. The type-equivalent interface structures associated with disjoint type graphs can share an identical layout. For example, disjoint type graphs can be permitted to share the memory layout of integral and floating point types such as 32 bit floating point numbers, 64 bit floating point numbers, integer, short, long, character pointers, and managed pointers.

In this context a managed pointer may be defined as a reference parameter. A contract can be identified by a name comprising a unique set of characters. The unique contract identifier can be associated with an interface having a particular immutable set of methods in the same order and a particular set of required methods. By declaring this name, the associated contract can be chosen.

Seamless High Performance Interoperability Between Different Type Graphs that Share a Garbage Collector FIG. 1a is a block diagram representing an example of a system for seamless high performance interoperability between different type graphs that share a garbage collector in accordance with aspects of the subject matter described herein. All or portions of system 100 may reside on one or more computers or computing devices such as the computers described below with respect to FIG. 3. System 100 or portions thereof may be provided as a stand-alone system or as a plug-in or add-in. System 100 may execute wholly or partially within an IDE or can execute wholly or partially outside an IDE. An IDE can be an IDE such as the one described with respect to FIG. 4 or can be any other IDE. All or portions of system 100 may be implemented as a plug-in or add-on.

System 100 or portions thereof may include information obtained from a service (e.g., in the cloud) or may operate in a cloud computing environment. A cloud computing environment can be an environment in which computing services are not owned but are provided on demand. For example, information may reside on multiple devices in a networked cloud and/or data can be stored on multiple devices within the cloud.

System 100 can include one or more computing devices such as, for example, computing device 102. Contemplated computing devices include but are not limited to desktop computers, tablet computers, laptop computers, notebook computers, personal digital assistants, smart phones, cellular telephones, mobile telephones, servers, virtual machines, devices including databases, firewalls and so on. A computing device such as computing device 102 can include one or more processors such as processor 142, etc., and a memory such as memory 144 that communicates with the one or more processors.

System 100 may include one or more program modules that when loaded into the memory and acted upon by the one or more processors perform the actions attributed to the program module(s). System 100 may include one or more development program modules such as development program module 105 and/or one or more runtime program modules such as runtime program module 107. Development program module 105 can enable a contract to which a type adhers to be specified. A runtime program module 107 may access the contract identifier associated with an interface. Runtime program module 107 may modify interface dispatch and casting logic to enable interface casting to an interface based on the specified contract. Interface dispatch refers to calling a method based on its name using an interface. In accordance with aspects of the subject matter described herein, the runtime program module 107 may enable interface dispatch for calls to different type spaces (referred to herein as type-equivalent dispatch).

A call to an interface that is not directly implemented by the type can be enabled by declaring that some other type implements this interface and that the implementation on the other type can be used. System 100 may include any one of or any combination of elements comprising: an application execution environment such as application runtime environment 112 executing an application such as application 104, a base class library such as application BCL 106*a*, associated with a first type graph such as type graph 1 106*b*, a high level runtime such as high level runtime 108*a* associated with a type graph such as type graph 2 108*b*, where the type graph associated with application 104 and the type graph associated with the high level runtime 108*a* are disjoint. A type graph is a graph in which each node in the graph represents a type and each arc in the graph represents a reference between nodes. Disjoint graphs are graphs in which there are no arcs between one type graph (a first type graph) and another type graph (a second type graph).

Application runtime environment 112 can execute an application 104 associated with an application base class library 106*a*. High level runtime 108*a* may include a type loader, a compiler such as but not limited to a just-in-time compiler (not shown), a program module that performs functions association with dynamic interoperation (not shown), and/or a program module that performs type casting (not shown), etc. High level runtime 108*a* may include the definition of the root node of a type graph such as type graph 2 108*b* associated with high level runtime 108*a*. The definition of the root node of a type graph associated with high level runtime 108*a* in accordance with some aspects of the subject matter described herein can be private. A low level execution runtime such as low level execution runtime 110*a* may include a garbage collector such as garbage collector 114, EH (exception handling) and/or a program module that coordinates threads for the GC 114, etc. Low level execution runtime 110*a* may include the definition of the root node of a type graph 110*b* associated with low level runtime 110*a*. The definition of the root node of a type graph associated with low level execution runtime 110*a* in accordance with some aspects of the subject matter described herein can be private.

Communication between application 104 and application BCL 106*a* indicated in FIG. 1*a* by arrow 116*a* comprises same type space communication because the type graphs of application 104 and application BCL 106*a* are the same (both use type graph 1 106*b*). Communication between application 104/application BCL 106*a* and high level runtime 108*a*, indicated by arrow 116*b*, comprises cross type space communication because application 104/application BCL 106*a* uses type graph 1 106*b* and high level runtime 108*a* uses type graph 2 108*b*, that is, the type graphs used are disjoint. Similarly, communication between high level runtime 108*a* and low level execution runtime 110*a*, indicated by arrow 116*c*, comprises cross type space communication because high level runtime 108*a* uses type graph 2 108*b* and low level execution runtime 110*a* uses type graph 3 110*b*, that is, the type graphs used are disjoint.

Figure 1B:
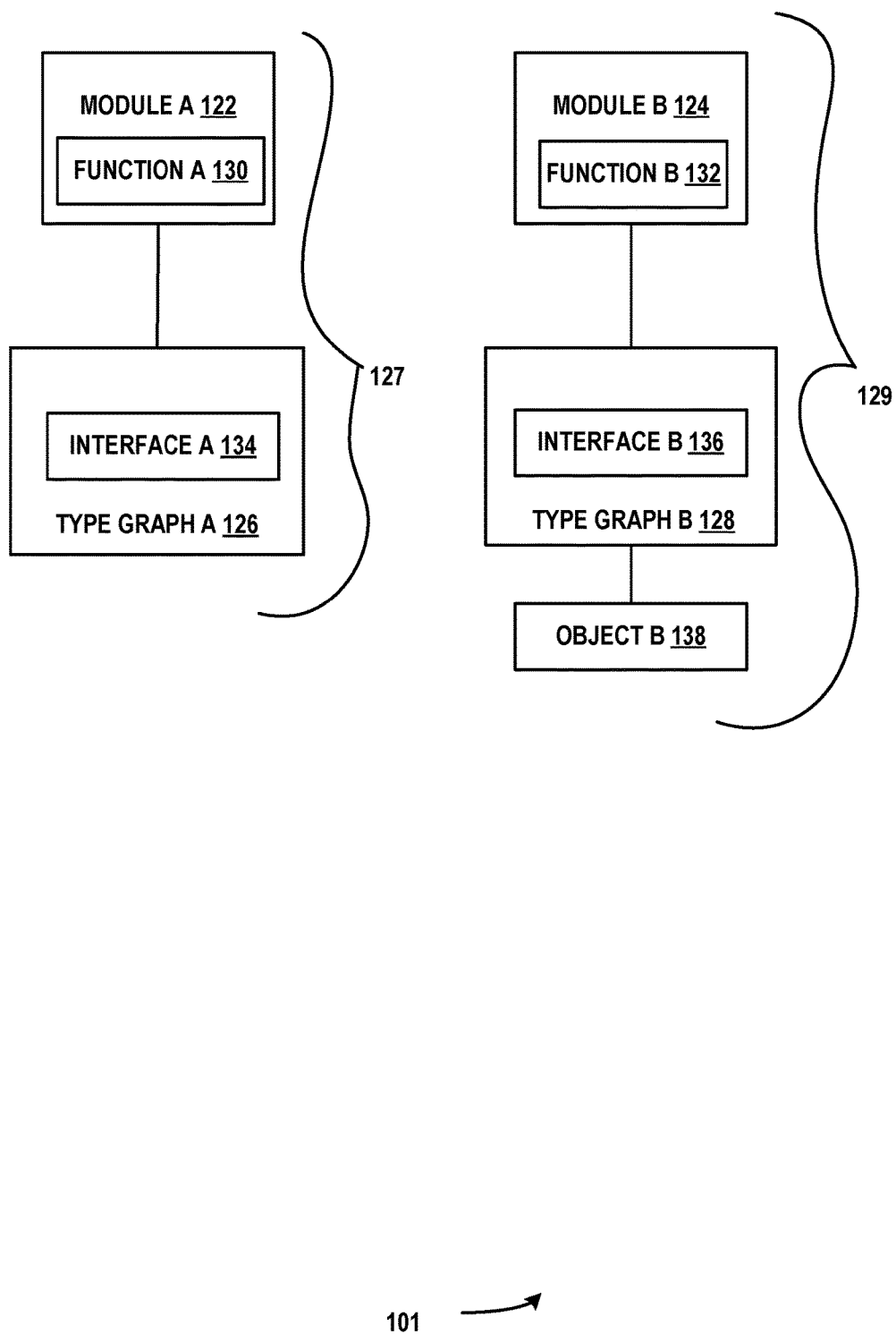
FIG. 1b is a block diagram 101 representing an example of a more detailed view of a portion of FIG. 1a in accordance with aspects of the subject matter described herein.

FIG. 1*b* is a block diagram representing an example 101 of cross type space communication as described with respect to FIG. 1*a* in accordance with aspects of the subject matter described herein. FIG. 1*b* illustrates a first type space 127 comprising a program module such as module A 122 comprising at least one function such as function A 130 associated with a first type graph, type graph A 126 and a first type-equivalent interface, interface A 134. FIG. 1*b* illustrates a second type space 129 comprising a program module such as module B 124 comprising at least one function such as function B 132 associated with a second type graph, type graph B 128 and a second type-equivalent interface, interface B 136. Program module A can define a type hierarchy. Program module A can define helper functionality. Program module A can define the root of type graph A 126. Program module A 122 can be associated with a first type graph. Code in module A 122 such as but not limited to, for example, function A 130, can use a first type graph such as, for example, type graph A 126, which is disjoint (separate) from type graphs such as for example, type graph B 128 used by another module in another type space such as, for example, by module B 124.

Function A 130 can use interface A 134 to communicate with a second type space. For example, function A 130 can make a function call using a type-equivalent interface such as interface A to access an object received from another type space having its own type graph (e.g., to access object B 138 received from module B 124). FIG. 1*b* illustrates a program module such as module B 124. Program module B can define its type hierarchy. Program module B can define its helper functionality. Program module B can define the root of type graph B 128*b*. Module B 124 can be associated with a second type graph. Code in module B 124 such as but not limited to, for example, function B 132, can use a type graph such as, for example, type graph B 128, which is disjoint (separate) from type graphs used by other modules in other type spaces such as, for example, module A 122. Function B 132 can use interface B 136 to communicate with another module which uses a first type graph such as, for example type graph A 128.

Figure 2A:
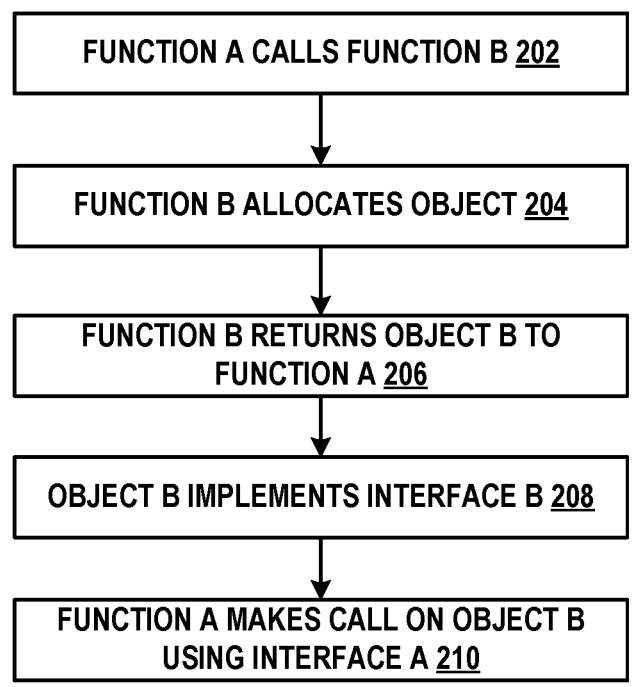
FIG. 2a illustrates an example of a method 200 for seamless high performance interoperability between different type graphs in accordance with aspects of the subject matter described herein.

FIG. 2*a* illustrates an example of a method 200 for cross type space communication in accordance with aspects of the subject matter described herein. While method 200 describes a series of operations that are performed in a sequence, it is to be understood that method 200 is not limited by the order of the sequence depicted. For instance, some operations may occur in a different order than that described. In addition, one operation may occur concurrently with another operation. In some instances, not all operations described are performed. In some instances, not all operations performed are illustrated. Method 200 or portions thereof may be executed by a system or a portion of a system such as system 100 and as described with respect to FIG. 1*b*.

At operation 202 a first function such as function A 130 associated with a first type graph such as type graph A 126 can make a direct cross type space function call to a different module such as, for example module B 124. A direct (static) function call does not use an interface. Code in module B 124 such as but not limited to function B 132 can allocate an object of a type defined in the type graph associated with module B (i.e., type graph B 128) at operation 204. That is, at operation 204 the code for function B 132 in module B 124 can allocate an object B 138 from module B's type graph B 128. The object allocated can implement the second type-equivalent interface (interface B 136). Module B 124 can return the object at operation 206 to function A 130 in module A 122 by making a static function call from module B 124 to module A 122. Module B 124 thus returns an object defined in the second type graph, type graph B to module A 122 associated with the first type graph, type graph A 126, the object implementing interface B (operation 208). At operation 210 the first module, module A 122 can make an interface call to the object using interface A 134 defined in type graph A 126. Interface A 134 and interface B 136 are type-equivalent. Because the code associated with a first type graph (e.g., type graph A 126) has access to an object in another (second) type graph (e.g., module A 122 has access to object B 138 in type graph B 128) code associated with one type graph can keep resources (e.g., object B) in another type graph alive. It will be appreciated that although described in terms of function A calling module B 124, the logic of method 200 also applies when function B 132 calls module A 122.

FIG. 2*b* illustrates an example 257 of application code implementing the above. In FIG. 2*b* the portion of code identified by reference numeral 250 identifies the type of type-equivalence. That it, this identifier establishes the contract identifying the particular dispatch logic to be used. The portion of code identified by reference numeral 251 acquires an instance of an object that implements a type-equivalent interface as described above. The portion of code identified by reference numeral 252 makes a call using a type-equivalent interface. The portion of code identified by reference numeral 253 indicates that at this point at which an object is being kept alive (will not be reclaimed by the GC) by one module even though the object is not in the type graph associated with that module.

Figure 2C:
FIG. 2c illustrates an example of runtime code in accordance with aspects of the subject matter described herein.

FIG. 2*c* is an example 255 of runtime code implementing the above. Suppose a first type graph associated with FIG. 2*b* is called AppTypeGraph and a second type graph associated with FIG. 2*c* is called RuntimeTypeGraph. AppTypeGraph may include the following types: System.Object; System.Type which derives from System.Object and can include a field of type ITypeDescriptor; RuntimeTypeHandle which can be a structure with a single field of type IntPtr, where IntPtr can be a primitive type that can represent a pointer; ITypeDescriptor which can be a seamless (type-equivalent) interface. The second type graph RuntimeTypeGraph may include the following types: System.Object, TypeRepresentation which can derive from System.Object and can implement ITypeDescriptor; IntPtr which can be a primitive type that can represent a pointer and ITypeDescriptor which can be a seamless interface.

Given Function Type Type.GetTypeFromHandle (RuntimeTypeHandle handle) which can get a System.Type object from a RuntimeTypeHandle, the effect may be to:

Get IntPtr field from handle.

Call ITypeRepresentation GetITypeDescriptorFromIntPtrOfType (IntPtr). This can be a function written in the Runtime, but can be specially annotated so that is can be called from the Application.

Create a System.Type object that contains the ITypeDescription returned in the previous statement.

Subsequently at some point in the future, from the application there can be a call to the Type.Attributes property on the System.Type object returned from the call to Type.GetTypeFromHandle. The implementation of that property would utilize the contained ITypeRepresentation interface and query the runtime to get the correct set of attributes. This operation to query the runtime via an interface call which is resolved by an object that is defined in a different type graph can be a seamless interface call across type graphs. It will be appreciated that although the examples are presented in the C# language, the subject matter described herein is not limited to any particular programming language.

Described herein is a computing device comprising at least one processor, a memory connected to the at least one processor and at least one program module that when loaded into the memory causes the at least one processor to communicate between a first type space associated with a first type graph and a second type space associated with a second type graph, wherein the first type space defines a root of the first type graph and the second type space defines a root of the second type graph, the first type graph and the second type graph being disjoint. One of the at least two different type spaces can be a runtime environment that supports at least one of a plurality of independent type hierarchies, the at least one independent type hierarchy defined by a module which defines a root of a type graph associated with the at least one independent type hierarchy.

One of at least two different type spaces can be an application runtime environment associated with a type graph wherein the type hierarchy of the type graph is defined by a module which defines a root of the type graph associated with the application runtime environment. An object in the first type graph can be kept alive by a module associated with the second type graph. Executables within at least two different type spaces are more version resilient because the type graphs of the at least two different types spaces are independent. The at least two different type spaces can use a same GC heap. The at least two different type spaces can use the same GC heap, wherein the GC manages the lifetime of objects belonging to the at least two difference type spaces on the same GC heap. Described herein is a method of communicating between at least two different type spaces in which a processor of a computing device receives a call from a first function in a first module, the module associated with a first type graph and defining a first type-equivalent interface, a static cross type space function call is made from the first function in the first module to a second module, the second module associated with a second type graph and defining a second type-equivalent interface. The second module can allocate an object of a type defined in the second type graph; the object implementing the second type-equivalent interface.

The object can be returned to the first function, by making a static function call from the second module to the first module. An interface call on the object can be made, from the first module using the first type equivalent interface. The first environment can be an application type space. The second environment can be a high-level or low-level runtime environment. A first module can define the root of a type graph for the first type space and the second module can define the root of a type graph for the second type graph. An interface call received by an object can execute as if a call were made on a second type-equivalent interface.

Described herein is a computing device including at least one processor, a memory connected to the at least one processor and at least one program module that when loaded into the memory causes the at least one processor to perform cross type space communication by creating type-equivalence by using identically named interfaces wherein a first identically-named interface is associated with a first type graph and a second identically-named interface is associated with a second type graph. The computer may include a funtime environment associated with a first type graph, such that the runtime environment supports at least one of a plurality of independent type hierarchies, the at least one independent type hierarchy defined by a module which defines a root of a type graph associated with the at least one independent type hierarchy. It may include an application execution environment associated with a second type graph, wherein a type hierarchy of the second type graph is defined by a module which defines a root of the second type graph.

It may include an application execution environment wherein an interface call is made on an object, from a first module using a first type-equivalent interface which executes as if a call were made using the second type-equivalent interface. It may include a first module that when executed makes a static cross type space function call from a first function in a first module to a second module, the second module associated with a second type graph and defining a second type-equivalent interface. It may include a second module that when executed allocates an object of a type defined in the second type graph; the object implementing the second type-equivalent interface; and returns the object to the first function, by making a static function call from the second module to the first module. The first module may make an interface call on an object of a type defined in the second type graph, from the first module using the first type-equivalent interface.

Example of a Suitable Computing Environment

Figure 3:
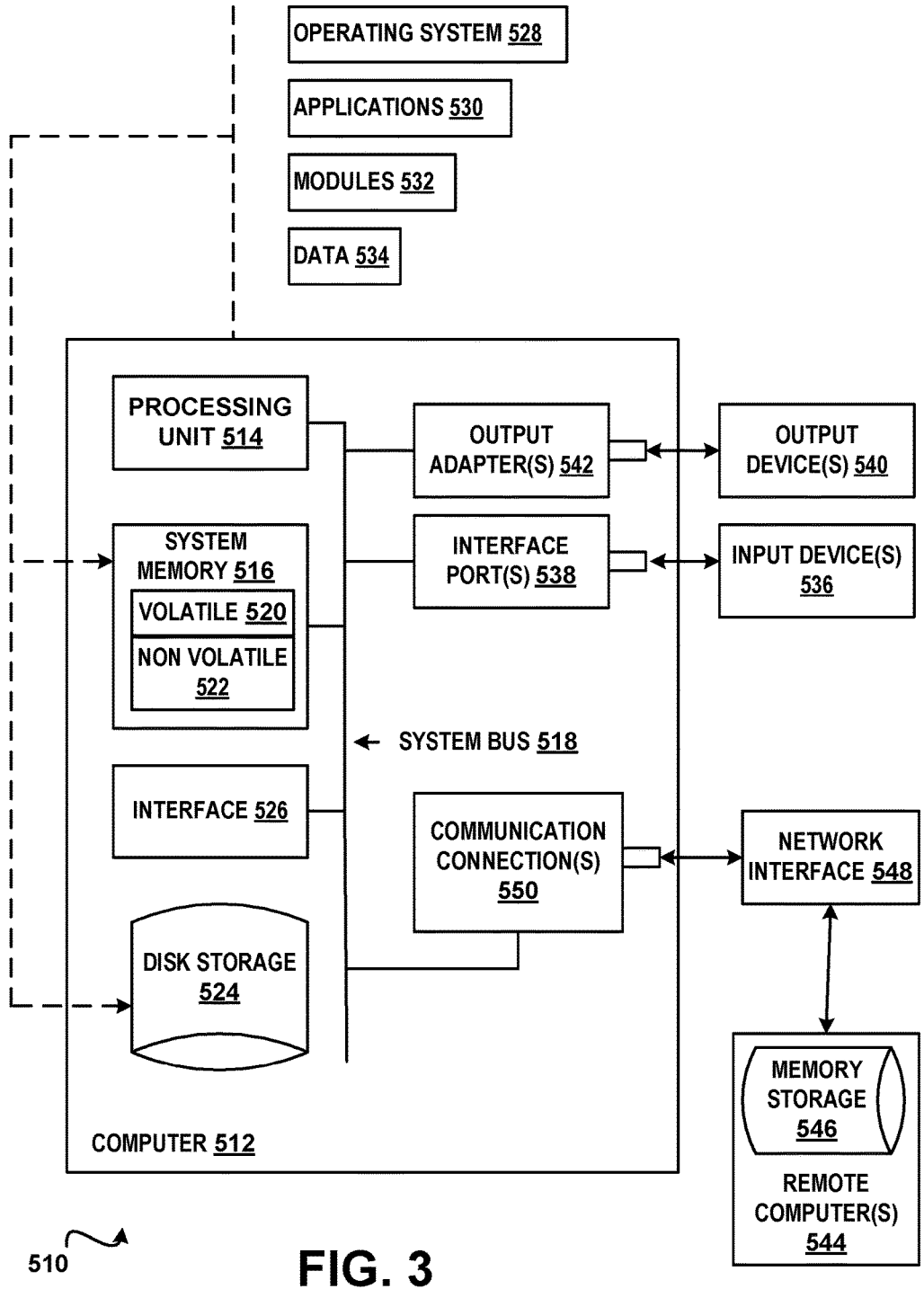
FIG. 3 is a block diagram of an example of a computing environment in accordance with aspects of the subject matter described herein.

In order to provide context for various aspects of the subject matter disclosed herein, FIG. 3 and the following discussion are intended to provide a brief general description of a suitable computing environment 510 in which various embodiments of the subject matter disclosed herein may be implemented. While the subject matter disclosed herein is described in the general context of computer-executable instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, physical artifacts, data structures, etc. that perform particular tasks or implement particular data types. Typically, the functionality of the program modules may be combined or distributed as desired in various embodiments. The computing environment 510 is only one example of a suitable operating environment and is not intended to limit the scope of use or functionality of the subject matter disclosed herein.

With reference to FIG. 3, a computing device in the form of a computer 512 is described. Computer 512 may include at least one processing unit 514, a system memory 516, and a system bus 518. The at least one processing unit 514 can execute instructions that are stored in a memory such as but not limited to system memory 516. The processing unit 514 can be any of various available processors. For example, the processing unit 514 can be a graphics processing unit (GPU). The instructions can be instructions for implementing functionality carried out by one or more components or modules discussed above or instructions for implementing one or more of the methods described above. Dual microprocessors and other multiprocessor architectures also can be employed as the processing unit 514. The computer 512 may be used in a system that supports rendering graphics on a display screen. In another example, at least a portion of the computing device can be used in a system that comprises a graphical processing unit. The system memory 516 may include volatile memory 520 and nonvolatile memory 522. Nonvolatile memory 522 can include read only memory (ROM), programmable ROM (PROM), electrically programmable ROM (EPROM) or flash memory. Volatile memory 520 may include random access memory (RAM) which may act as external cache memory. The system bus 518 couples system physical artifacts including the system memory 516 to the processing unit 514. The system bus 518 can be any of several types including a memory bus, memory controller, peripheral bus, external bus, or local bus and may use any variety of available bus architectures. Computer 512 may include a data store accessible by the processing unit 514 by way of the system bus 518. The data store may include executable instructions, 3D models, materials, textures and so on for graphics rendering.

Computer 512 typically includes a variety of computer readable media such as volatile and nonvolatile media, removable and non-removable media. Computer readable media may be implemented in any method or technology for storage of information such as computer readable instructions, data structures, program modules or other data. Computer readable media include computer-readable storage media (also referred to as computer storage media) and communications media. Computer storage media includes physical (tangible) media, such as but not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices that can store the desired data and which can be accessed by computer 512. Communications media include media such as, but not limited to, communications signals, modulated carrier waves or any other intangible media which can be used to communicate the desired information and which can be accessed by computer 512.

It will be appreciated that FIG. 3 describes software that can act as an intermediary between users and computer resources. This software may include an operating system 528 which can be stored on disk storage 524, and which can allocate resources of the computer 512. Disk storage 524 may be a hard disk drive connected to the system bus 518 through a non-removable memory interface such as interface 526. System applications 530 take advantage of the management of resources by operating system 528 through program modules 532 and program data 534 stored either in system memory 516 or on disk storage 524. It will be appreciated that computers can be implemented with various operating systems or combinations of operating systems.

A user can enter commands or information into the computer 512 through an input device(s) 536. Input devices 536 include but are not limited to a pointing device such as a mouse, trackball, stylus, touch pad, keyboard, microphone, voice recognition and gesture recognition systems and the like. These and other input devices connect to the processing unit 514 through the system bus 518 via interface port(s) 538. An interface port(s) 538 may represent a serial port, parallel port, universal serial bus (USB) and the like. Output devices(s) 540 may use the same type of ports as do the input devices. Output adapter 542 is provided to illustrate that there are some output devices 540 like monitors, speakers and printers that require particular adapters. Output adapters 542 include but are not limited to video and sound cards that provide a connection between the output device 540 and the system bus 518. Other devices and/or systems or devices such as remote computer(s) 544 may provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 3. Remote computer(s) 544 can be logically connected via communication connection(s) 550. Network interface 548 encompasses communication networks such as local area networks (LANs) and wide area networks (WANs) but may also include other networks. Communication connection(s) 550 refers to the hardware/software employed to connect the network interface 548 to the bus 518. Communication connection(s) 550 may be internal to or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 512 or other client device can be deployed as part of a computer network. In this regard, the subject matter disclosed herein may pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

Figure 4:
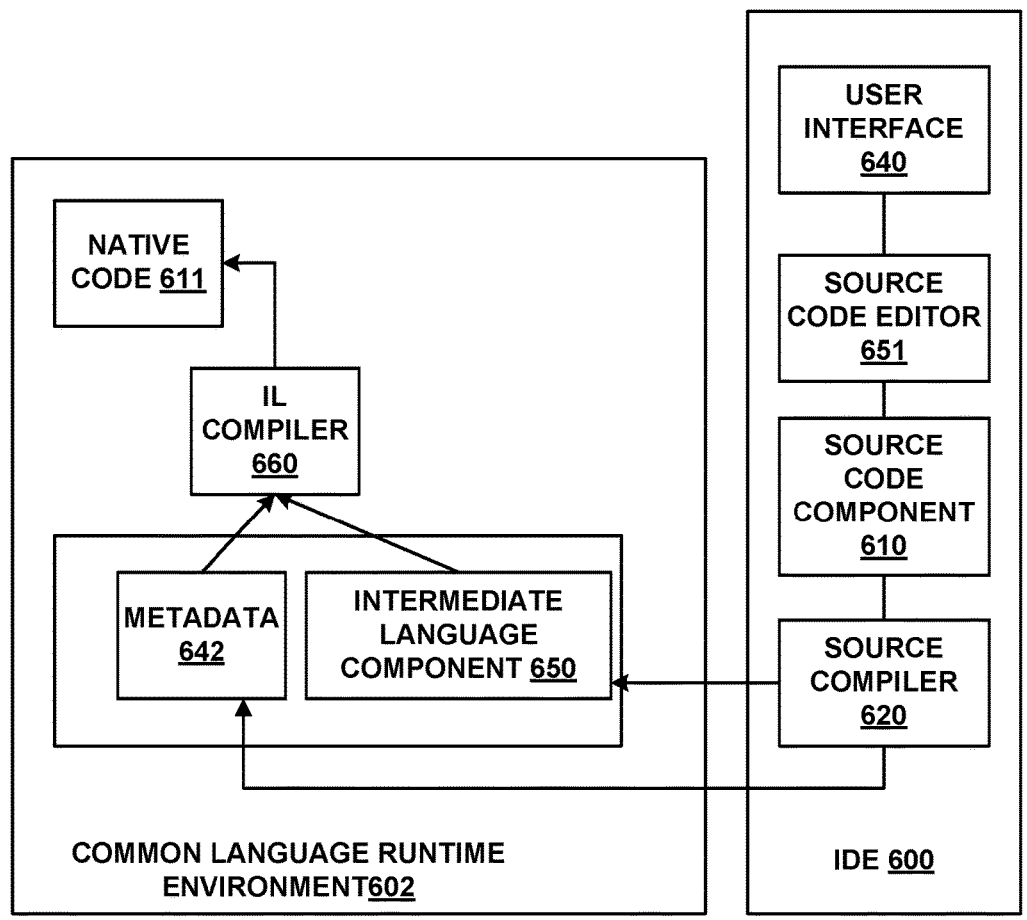
FIG. 4 is a block diagram of an example of an integrated development environment in accordance with aspects of the subject matter described herein.

FIG. 4 illustrates an integrated development environment (IDE) 600 and Common Language Runtime Environment 602. An IDE 600 may allow a user (e.g., developer, programmer, designer, coder, etc.) to design, code, compile, test, run, edit, debug or build a program, set of programs, web sites, web applications, and web services in a computer system. Software programs can include source code (component 610), created in one or more source code languages (e.g., Visual Basic, Visual J#, C++. C#, J#, Java Script, APL, COBOL, Pascal, Eiffel, Haskell, ML, Oberon, Perl, Python, Scheme, Smalltalk and the like). The IDE 600 may provide a native code development environment or may provide a managed code development that runs on a virtual machine or may provide a combination thereof. The IDE 600 may provide a managed code development environment using the .NET framework. An intermediate language component 650 may be created from the source code component 610 and the native code component 611 using a language specific source compiler 620 and the native code component 611 (e.g., machine executable instructions) is created from the intermediate language component 650 using the intermediate language compiler 660 (e.g. just-in-time (JIT) compiler), when the application is executed. That is, when an IL application is executed, it is compiled while being executed into the appropriate machine language for the platform it is being executed on, thereby making code portable across several platforms. Alternatively, in other embodiments, programs may be compiled to native code machine language (not shown) appropriate for its intended platform.

A user can create and/or edit the source code component according to known software programming techniques and the specific logical and syntactical rules associated with a particular source language via a user interface 640 and a source code editor 651 in the IDE 600. Thereafter, the source code component 610 can be compiled via a source compiler 620, whereby an intermediate language representation of the program may be created, such as assembly 630. The assembly 630 may comprise the intermediate language component 650 and metadata 642. Application designs may be able to be validated before deployment.

The various techniques described herein may be implemented in connection with hardware or software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. As used herein, the term "machine-readable medium" shall be taken to exclude any mechanism that provides (i.e., stores and/or transmits) any form of propagated signals. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects, e.g., through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method comprising:
receiving by a processor of a computing device a call from a first function in a first module, the first module associated with a first type graph and defining a first type-equivalent interface;
making a static cross type space function call from the first function in the first module to a second module, the second module associated with a second type graph and defining a second type-equivalent interface, the first type graph and the second type graph are disjoint;
allocating by the second module an object of a type defined in the second type graph, the object implementing the second type-equivalent interface, wherein the first type-equivalent interface and the second type-equivalent interface have a same unique identifier;
returning the object to the first function, by making a static function call from the second module to the first module; and
making an interface call on the object, from the first module using the first type-equivalent interface, wherein the first type-equivalent interface call received by the object executes as if a call were made on the second type-equivalent interface.

2. The method of claim 1, wherein:
the first module is an application runtime environment.

3. The method of claim 1, wherein:
the second module is a high-level runtime environment.

4. The method of claim 1, wherein:
the second module is a low-level runtime environment.

5. The method of claim 1, wherein the first module defines the root of a type graph for a first type space and the second module defines the root of a type graph for the second type graph.

6. The method of claim 1, wherein the first type-equivalent interface and the second type-equivalent interface share an identical memory layout.

7. The method of claim 1, wherein the first type graph and the second type graph share a garbage collector.

8. The method of claim 1, wherein a garbage collector manages lifetime of objects associated with the first type graph and the second type graph.

9. The method of claim 1,
wherein the first type graph is associated with a first type space and the second type graph is associated with a second type space, and
wherein the first type space and the second type space are independent and share a same garbage collected heap.

10. The method of claim 1, wherein the same unique identifier is an identical name.

11. A system, comprising:
at least one processor and a memory;
wherein the at least one processor is configured to:
make a static cross type space function call from a first function in a first module to a second module, the second module associated with a second type graph and defining a second type-equivalent interface, the first module associated with a first type graph and defining a first type-equivalent interface, wherein the first type graph and the second type graph are disjoint;
allocate an object of a type defined in the second type graph, the object implementing the second type-equivalent interface, wherein the first type-equivalent interface and the second type-equivalent interface share a unique identifier;
return the object to the first function, by making a static function call from the second module to the first module; and
make an interface call on the object, from the first module using the first type-equivalent interface, wherein the first type-equivalent interface call received by the object executes as if a call were made on the second type-equivalent interface.

12. The system of claim 11, further comprising: a runtime environment associated with the first type graph, the runtime environment supports at least one of a plurality of independent type hierarchies, the at least one independent type hierarchy defined by a module which defines a root of a type graph associated with the at least one independent type hierarchy.

13. The system of claim 11, further comprising:
an application execution environment associated with the second type graph, wherein a type hierarchy of the second type graph is defined by a module which defines a root of the second type graph.

14. The system of claim 11, wherein the first module and the second module share a common garbage collector.

15. The system of claim 11, wherein the first type-equivalent interface and the second type-equivalent interface share a common memory layout.

16. The system of claim 11, wherein the first type graph and the second type graph share a garage collector.

17. The system of claim 11, wherein the unique identifier is an identical name.

18. The system of claim 11, wherein the first type graph is associated with a first type space and the second type graph is associated with a second type space, and
wherein the first type space and the second type space are independent and share a common garbage collected heap.

* * * * *